United States Patent
Suzuki et al.

(10) Patent No.: US 7,635,427 B2
(45) Date of Patent: Dec. 22, 2009

(54) ION EXCHANGE FILTER

(75) Inventors: Koji Suzuki, Shizuoka (JP); Keisuke Wakabayashi, Kanagawa (JP)

(73) Assignee: Toyo Roki Seizo Kabushiki Kaisha, Shizuoka (JP)

( * ) Notice: Subject to any disclaimer, the term of this patent is extended or adjusted under 35 U.S.C. 154(b) by 444 days.

(21) Appl. No.: 11/604,680

(22) Filed: Nov. 28, 2006

(65) Prior Publication Data
US 2007/0119770 A1    May 31, 2007

(30) Foreign Application Priority Data
Nov. 29, 2005 (JP) .............................. 2005-344551

(51) Int. Cl.
*B01D 24/04* (2006.01)
*B01D 24/16* (2006.01)
(52) U.S. Cl. .................. 210/282; 210/287; 210/289; 210/352
(58) Field of Classification Search ............. 210/282, 210/287, 289, 352
See application file for complete search history.

(56) References Cited

U.S. PATENT DOCUMENTS 3,184,064 A * 5/1965 Sampson et al. ............ 210/136
4,287,057 A * 9/1981 Stanley ........................ 210/85

FOREIGN PATENT DOCUMENTS

JP    2005-161117    6/2005

* cited by examiner

*Primary Examiner*—Matthew O Savage
(74) *Attorney, Agent, or Firm*—Wenderoth, Lind & Ponack, L.L.P.

(57) ABSTRACT

An ion exchange filter for a fuel cell system includes a housing with a fluid flow-in port and a cartridge which is disposed inside the housing and in which an ion exchange resin is filled, the fluid flowing in the cartridge through the flow-in port is filtrated therein by the ion exchange resin and the filtrated fluid flows out through the flow-out port. The housing has a casing having an opened upper end and a lid closing the upper end opening, and the fluid flow-in port has an outer peripheral wall of the casing at a portion above a bottom surface of the cartridge disposed inside the housing and the fluid flow-out port is formed to the lid, and a gap is formed between the housing and the cartridge for flowing the fluid flowing inside the housing through the flow-in port towards the bottom portion of the housing.

10 Claims, 10 Drawing Sheets

ION EXCHANGE FILTER

BACKGROUND OF THE INVENTION

1. Field of the Invention

The present invention relates to anion exchange filter (or ion-exchanging type filter) for removing impurity ion from a fluid flowing in a circuit of a fuel cell system.

2. Related Art

A fuel cell is one kind of cell in which electric power is generated through electrical and chemical reaction between hydrogen and oxygen in air, and is expected as a next generation fuel for automobiles. Such a fuel cell system is provided with a cooling water circulation circuit for cooling a fuel cell stack which carries out the reaction between the hydrogen and oxygen. In the event that ions are dissolved in the cooling water from conduits or the like in the circulation circuit, electric conductivity is lowered, and hence, a power generation efficiency of the fuel cell body is reduced. For this reason, an ion exchange filter is provided for the cooling water circulation circuit for removing the ions in the cooling water.

The applicant of this application has variously studied and developed ion exchange filters, and Japanese Patent Unexamined Application Publication No. 2005-161117 by the same applicant as that of the present invention discloses an ion exchange filter. After the development of such ion exchange filter, the applicant further studied and developed technologies in which a housing and a cartridge are formed of resin material, of course, as well as metal materials. In the case of the resin material, light-weight can be realized, but pressure-resisting property is reduced.

SUMMARY OF THE INVENTION

The present invention was conceived in consideration of the above circumstances and an object thereof is to provide an ion exchange filter capable of being less influenced by pressure in a circuit of a fuel cell system regardless of a material constituting the ion exchange filter.

This and other objects can be achieved according to the present invention by providing an ion exchange filter provided for a fuel cell system in which a fluid circulates, comprising:

a housing provided with a fluid flow-in port through which a fluid flows in and a fluid flow-out port through which the fluid flows out; and a cartridge which is disposed inside the housing and in which an ion exchange resin is filled, the fluid flowing in the cartridge through the flow-in port is filtrated by the ion exchange resin and the filtrated fluid flows out through the flow-out port, wherein the housing is provided with a casing having an opened upper end and a lid closing the upper end opening, the lid having a peripheral edge joined and formed integrally with an upper end edge of the casing, the fluid flow-in port is provided to an outer peripheral wall of the casing at a portion above a bottom surface of the cartridge disposed inside the housing, and the fluid flow-out port is formed to the lid, and a gap is formed between the housing and the cartridge so that the fluid introduced inside the gap through the fluid flow-in port flows toward the bottom portion of the housing, and the fluid then flows, in a flow passage formed in the housing, upward from the bottom portion of the housing.

In a preferred embodiment of the above aspect, it is desirable that the flow-in port is provided with an orifice configured to reduce a pressure of the fluid flowing through the flow-in port. It is also desirable that the ion exchange filter further includes a seal member disposed in the gap defined between the housing and the cartridge so as to seal a portion between an inner peripheral surface of the casing and an outer peripheral surface of the cartridge and is disposed entirely ciumferentially of the casing and the housing so as to section the gap into a fluid flow-in side and a joining side joining the casing and the lid, and another seal member disposed between the lid and the cartridge so as to prevent the fluid flowing from the cartridge to the flow-out port from leaking to the joining side.

A vibration isolation member may be disposed between the cartridge and the housing so as to support the cartridge with respect to an inner surface of the housing.

The cartridge may be formed with a fluid inlet and a fluid outlet, either one of which is covered with a stainless mesh. The fluid inlet of the cartridge may be covered with the stainless mesh which is integrally formed with the cartridge at a time when the cartridge is molded. The fluid outlet of the cartridge may be covered with the stainless mesh and two meshes are doubly disposed in a direction along which the fluid flows.

It may be desired that the cartridge is provided with a cartridge body having a cylindrical structure having opened ends and first and second plates fitted inside the cartridge body so as to close the opened ends, respectively, the two meshes are integrally formed to the two plates, respectively, and seal members are fitted between an outer peripheral surfaces of the plates and the inner surface of the cartridge body so that one or more seal members are provided for each plate so as to provide a plurality of sealing portions in the axial direction of the cartridge.

The first plate may be disposed on the opened end side of the cartridge body, the second plate is disposed inside the first plate in the cartridge body, and the first plate is provided with two seal members. It may be further desired that the first plate disposed on the opened end side of the cartridge body is formed, at an outer peripheral surface, with an engaging claw so as to be engaged with the cartridge body, the two seal members disposed to the outer peripheral surface of the first plates are arranged above and below the engaging claw in the vertical direction of the cartridge body, the cartridge body is formed with an engaging hole at a portion near the opened end thereof so as to be engaged with the engaging claw, and the seal members are snapped between the outer peripheral surface of the first plate and the inner surface of the cartridge body so as to surround the engaging hole engaged with the engaging claw from the upper and lower portions thereof to thereby seal the engaging hole.

The housing and the cartridge may be formed of resin or metal material.

The cartridge disposed inside the housing has a portion tapered downward toward the bottom portion of the housing so that the gap formed therebetween is widened toward the bottom portion of the housing.

According to the present invention having the structures and characters mentioned above, the flow-in port is formed above the bottom portion of the housing and the gap is formed between the housing and the cartridge for flowing the fluid flowing inside the housing through the flow-in port towards the bottom portion of the housing, and the flowing fluid flows downward through the gap is then flows upward from the bottom portion in the housing. Accordingly, even in a circuit arrangement in which the flow-in port and the flow-out port are disposed near to each other, the fluid flows from one end towards the other end in the axial direction of the cartridge, whereby improved durability can be provided and the ion exchange resin in the cartridge can be effectively utilized.

Furthermore, in the ion exchange filter of the present invention, since the fluid flow-in port is formed to the peripheral wall surface of the casing, the flow-in fluid flows downward, without flowing toward the upper lid side, toward the bottom portion of the housing. That is, the ion exchange filter of the present invention has the structure effectively preventing the fluid from flowing to the joining portion between the casing the lid, and accordingly, the joining portion can maintain high joining performance without being influenced by the fluid, thus realizing high durability and ensuring high coaxing performance of the cartridge with respect to the housing.

The nature and further characteristic features of the present invention will be made clearer from the following descriptions made with reference to the accompanying drawings.

DESCRIPTION OF THE PREFERRED EMBODIMENT

Figure 1:
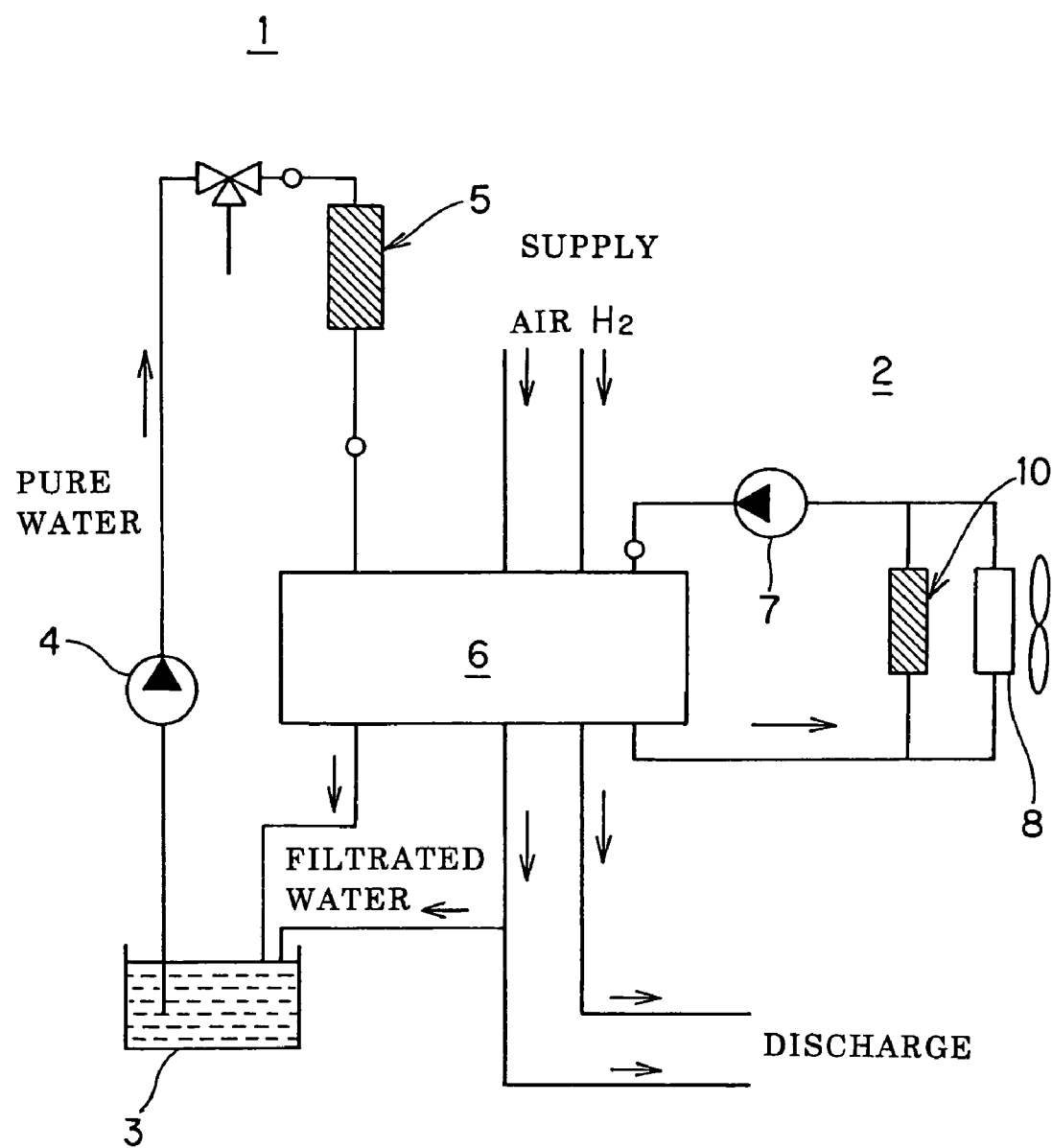
FIG. 1 is an illustrated diagram showing one example of a fuel cell system to which an ion exchange filter according to the present invention is utilized.

Hereunder, a first embodiment of the present invention will be described with reference to the accompanying drawings. Further, it is to be noted that terms "upper", "lower", "left", "right" and like terms are used herein in an illustrated state in the drawings or in a generally usable state of an ion exchange filter.

FIG. 1 illustrates an arrangement of a fuel cell system to which an ion exchange filter of the first embodiment is used.

The fuel cell system includes a pure water humidifying system 1 for humidifying an ion exchange film of a fuel cell stack and a cooling system 2 for cooling the fuel cell stack.

In the pure water humidifying system 1, pure water is sucked up from a pure water tank 3 by means of a pump 4 and the pumped-up water is fed to anion exchange filter to pass it. When the pure water passes the ion exchange filter 5, electric conductivity is lowered. The pure water of which conductivity is lowered is supplied to the fuel cell stack 6 to thereby humidify an inner ion exchange film. Remaining pure water returns again to the pure water tank 3. In addition, water generated by a reaction by an air pole of the fuel cell stack 6 is also returned to the pure water tank 3.

On the other hand, in the cooling system 2, the cooling water is circulated between the fuel cell stack 6 and a radiator 8 by means of pump 7. The cooling water cooled by the radiator 8 is fed to the fuel cell stack 6, and the cooling water after cooling the fuel cell stack 6 is fed to the radiator 8. In order to obtain cooling water having low electric conductivity, an ion exchange filter 10 is provided for the cooling system 2.

Although an ion exchange filter according to the present invention may be provided for either one of the pure water humidifying system 1 or the cooling system 2, an example in which the ion exchange filter is applied to the cooling system 2 will be explained herein.

Figure 2:
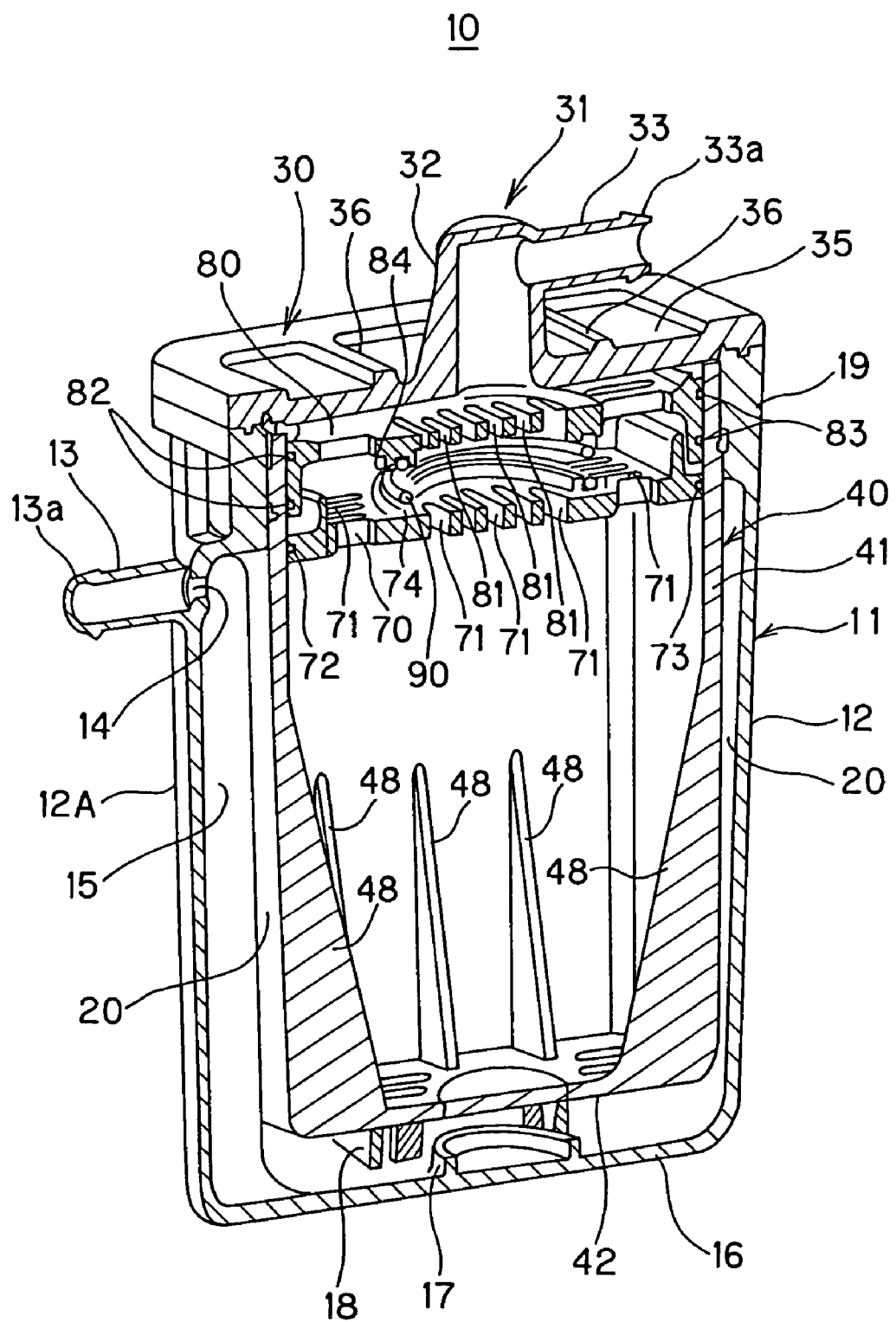
FIG. 2 is a vertical sectional view showing an inner structure of the ion exchange filter.

FIG. 2 is a sectional view showing an inner structure of the ion exchange filter 10 according to the first embodiment of the present invention. This ion exchange filter 10 is connected to a cooling water circulation circuit provided for the fuel cell system so as to cool the fuel cell stack 6.

The ion exchange filter 10 is provided with a rectangular housing 11 constituting an outer shell of the filter 10 and a cartridge 40 disposed inside the housing, and the cartridge is filled up with an ion exchange resin.

The housing 11 includes a casing 12 having an upper opening and a lid 30 for closing the upper end opening of the casing 12. The casing 12 is constituted by four surrounding walls. One of these peripheral walls 12A is formed, at an upper portion of the casing 12, with a flow-in port 13 projecting outward. This flow-in port 13 is a portion through which the cooling water passing through the circuit flows in the casing 12. A flow passage 15 connecting the flow-in port to a bottom portion of the casing 12 is formed to the peripheral wall 12A so as to expand outward at its central portion.

The flow-in port 13 and the flow passage 15 are in communication with each other through an orifice 14 at a root portion of the flow-in port 13 and an upper portion of the flow passage 15. The orifice 14 is formed integrally with the casing 12 at the time of molding the casing 12. The orifice 14 is formed by throttling the flow-in port 13 at its root portion, and hence serves to reduce pressure of the cooling water at a time when the cooling water flows in the ion exchange filter 10 to thereby prevent the housing from breaking.

Circular-arc ribs 17 and 18 positioning and supporting the cartridge 40 in the housing 11 are formed at a central portion of the bottom portion of the housing 11. Further, a portion of the casing 12 above the flow-in port 13 is formed so as to have a slightly large thickness.

Figure 10:
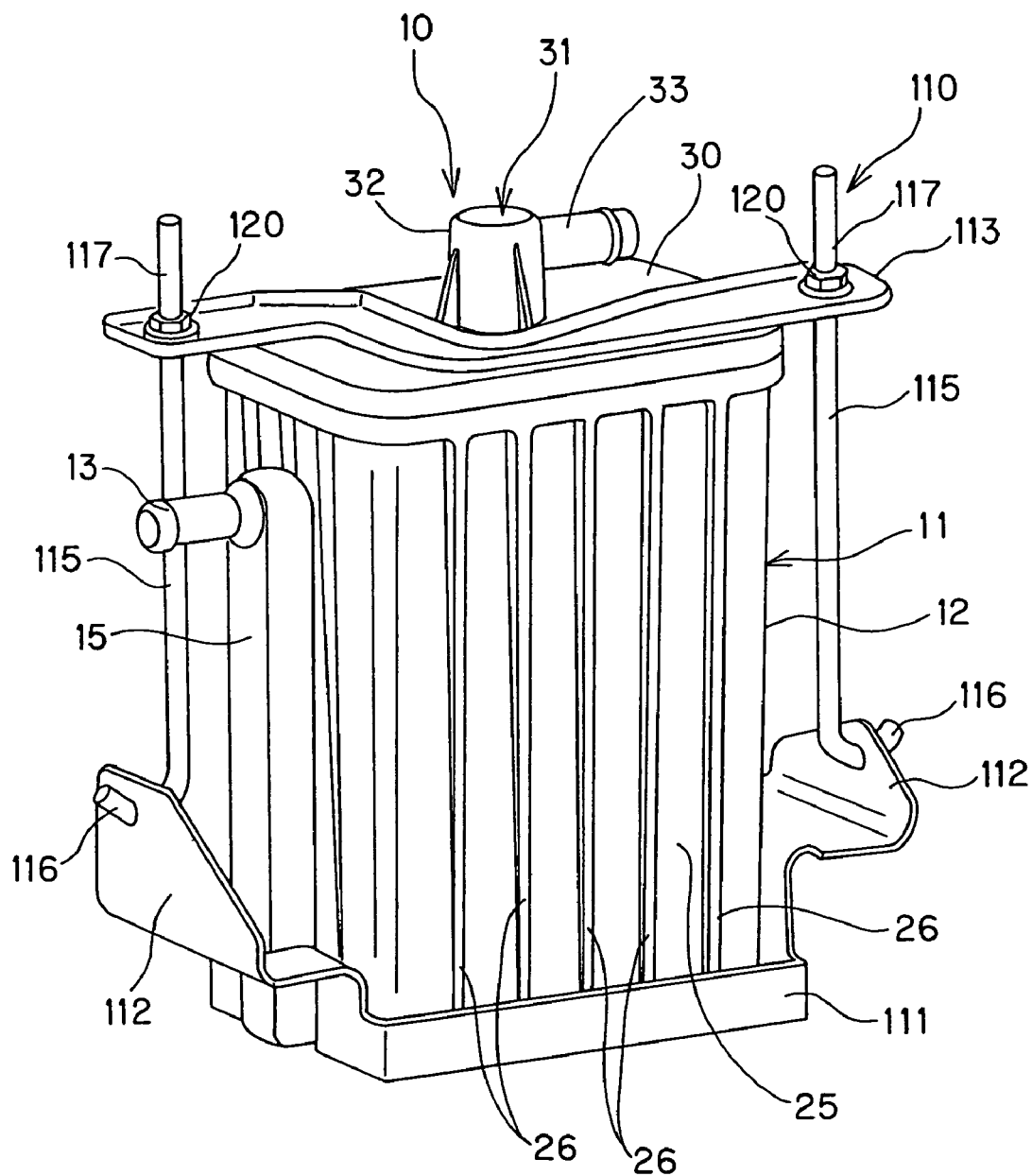
FIG. 10 is a perspective view of an ion exchange filter which is held by means of a mount jig.

As shown in FIG. 10, a plurality of reinforcing ribs 26 are formed to an outer surface of the peripheral wall section of the casing 12 so as to extend vertically to thereby improve the strength of the casing 12.

The lid 30 is formed from a flat plate, and a flow-out port 31 is formed in the central portion thereof so as to extend upward. Reinforcing ribs 36 are also formed on the outer surface 35 of the lid 30 to thereby improve the strength of the lid 30. The flow-out port 31 of this embodiment is composed of a base tube portion 32 extending upward from the lid 30 and a discharge tube portion 33 having a substantially right angle to the base tube portion 32 and projecting in a direction opposing to the projecting direction of the flow-in port 13.

Further, retaining portions 13a and 33a projecting radially outward are formed to the front end portions of the flow-in port 13 and the discharge tube portion 33 so that hoses do not easily come off when the hoses are fitted and connected to the front end portions thereof.

The cartridge to be mounted inside the housing 11 of the structure mentioned above has a rectangular shape smaller in size than the housing 11. The cartridge 40 is composed of a resin body 41 having a rectangular shape with an upper end opened and two resin plates 70 and 80 closing the opened upper end of the resin body 41. A bottom portion 42 of the cartridge 40 is formed as a cooling water inlet, and on the other hand, the opened upper end serves as a cooling water outlet.

Figure 3:
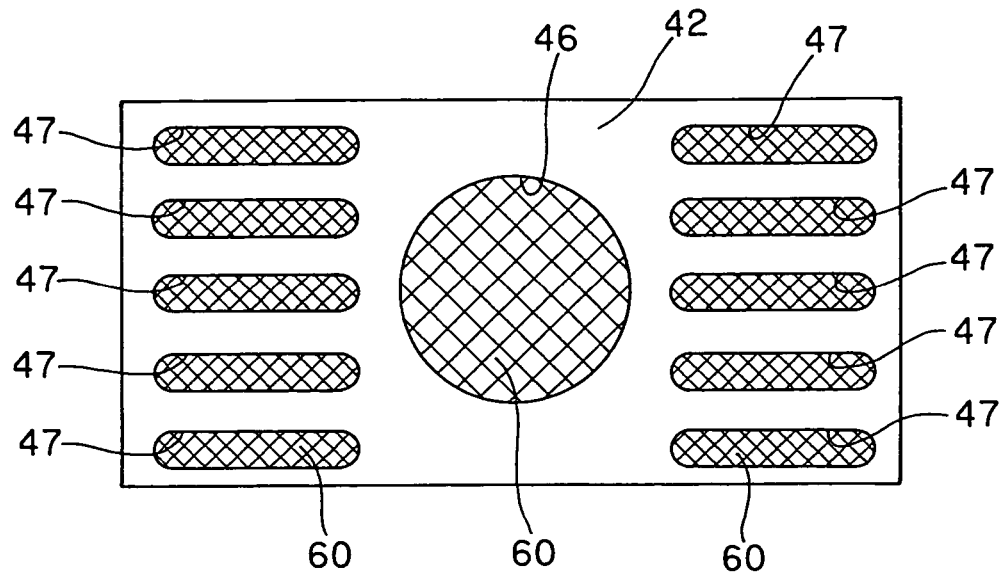
FIG. 3 is a plan view showing a bottom surface of a body constituting a cartridge.

As shown in FIG. 3, the bottom portion 42 of the cartridge 40 formed as the cooling water inlet is provided with a circular hole 46 positioned at a central portion of the bottom portion 42 and a plurality of slots 47, and the circular hole 46 and the slots 47 enable communication between the inside and outside of the body 41 so that the cooling water is introduced into the body 41 through these hole 46 and slots 47. The shapes and arrangements of the hole 46 and slots 47 are not limited to the example shown in FIG. 3, and many other alternations or modifications may be adopted as far as the cooling water can sufficiently evenly flow inside the cartridge 40. Further, in the cartridge 40 of this embodiment, triangular ribs 48 are formed to the lower portions of the body 41 inside the peripheral wall surface.

The circular hole 46 and the slots 47 of the cartridge 40 of the ion exchange filter 10 of the described embodiment are covered by a mesh 60 made of stainless steel. The mesh 60 prevents foreign materials from entering inside the cartridge 40 and prevents the ion exchange resin filling inside the cartridge 40 from being discharged therefrom. Since the mesh 60 is made of stainless steel, the mesh 60 has a high strength, thus being effectively prevented from damaging.

Figure 4:
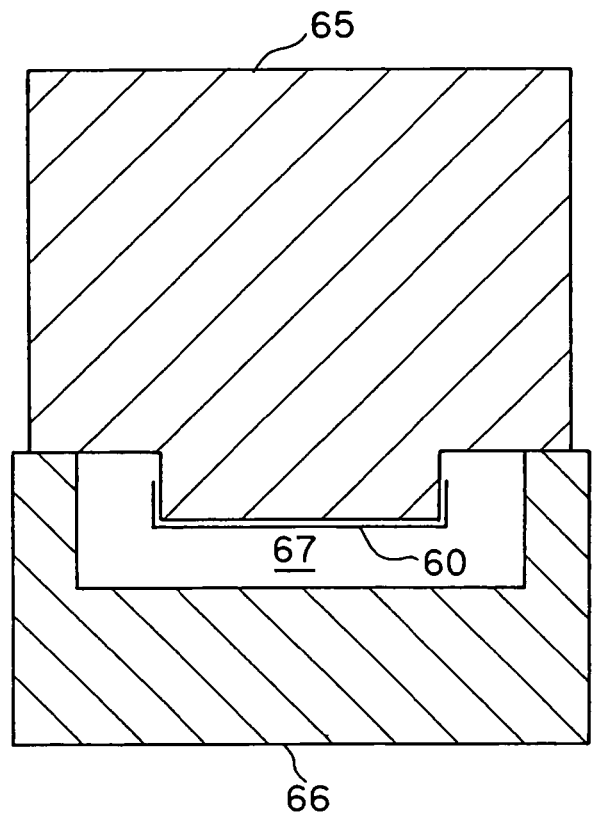
FIG. 4 is an illustration for explaining steps of assembling a mesh into the cartridge body.

The mesh 60 has a size slightly larger than the bottom area of the cartridge body 41 and integrally assembled with the bottom portion 42 of the body 41 when molded. FIG. 4 shows a state of molding the mesh 60.

With reference to FIG. 4, the mesh 60 is set at a desired position for assembling in a cavity formed by mold halves 65 and 66. In this time, the peripheral edge of the mesh is bent or folded, and resin is poured into the cavity. According to this process, the cartridge body 41 in which the mesh 60 is assembled with the bottom portion 42 thereof can be obtained. In this process, since the peripheral edge of the mesh 60 is folded, the mesh 60 can be firmly assembled with the cartridge body 41. Accordingly, the mesh 60 is never shifted from the cartridge body 41 nor come off therefrom, thus effectively preventing any trouble or inconvenience.

Figure 5:
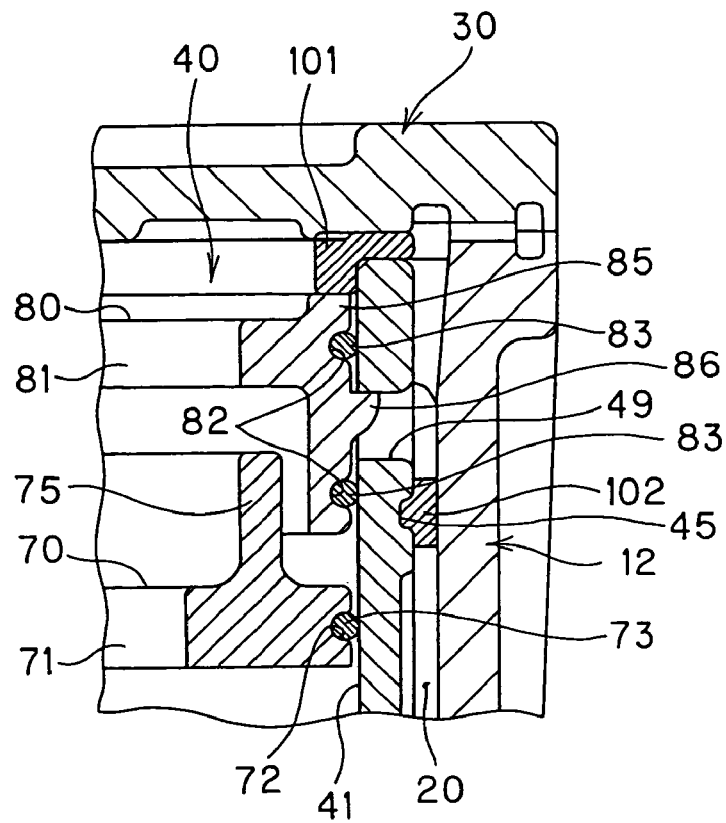
FIG. 5 is a partial sectional view, in an enlarged scale, showing a support structure for a housing disposed above the cartridge.

On the other hand, the upper end opening of the cartridge body 41 constituting the outlet 44 for the cooling water is closed by two resin plates 70 and 80 as shown in FIG. 5. These two resin plates 70 and 80 are disposed so as to be opposed to each other in the axial direction of the cartridge 40 and fitted inside the body 41 to be parallel with each other.

These two resin plates 70 and 80 are plate members having an outer shape of substantially the same dimension as that of the inner peripheral surface of the cartridge body 41. The resin plates 70 and 80 are formed with a plurality of slits 71 and 81, respectively, which are covered by first and second stainless meshes, 87 and 77, and which serve as discharge ports for discharging the cooling water flowing in the cartridge 40 and filtrated therein from the cartridge 40 toward the flow-out port 31 formed to the housing 11. Further, the meshes are assembled with the resin plates 70 and 80 by the same manner as that mentioned with reference to FIG. 4. Therefore, the problem that the meshes can shift or come off of the plates 70 and 80 can be effectively prevented. The meshes assembled with these plates 70 and 80 allow the cooling water to flow through the slits 71 and 81 and prevents the ion exchange resin from being discharged from the cartridge 40. In addition, since the meshes are also formed of stainless steel, high strength can be maintained while preventing the meshes from being broken.

The resin plate 70 is arranged below the resin plate 80 so as to be vertically movable inside the cartridge body 41, and the resin plate 80 disposed on an upper side is fixed to the upper end of the cartridge body 41.

The outer peripheral edge of the lower resin plate 70 has a thickness substantially equal to that of the resin plate 70. One seal groove 72 is formed to a central position of the entire outer peripheral surface of the resin plate 70 in the thickness direction thereof, and a seal member 73 is fitted to this seal groove 72. Furthermore, a guide 75 is formed to an upper surface of the resin plate 70 at a position slightly inward the peripheral edge thereof so as to project upward. This guide 75 serves to vertically guide the resin plate 70 while preventing this lower resin plate 70 from largely inclining with respect to the upper resin plate 80.

Figure 6:
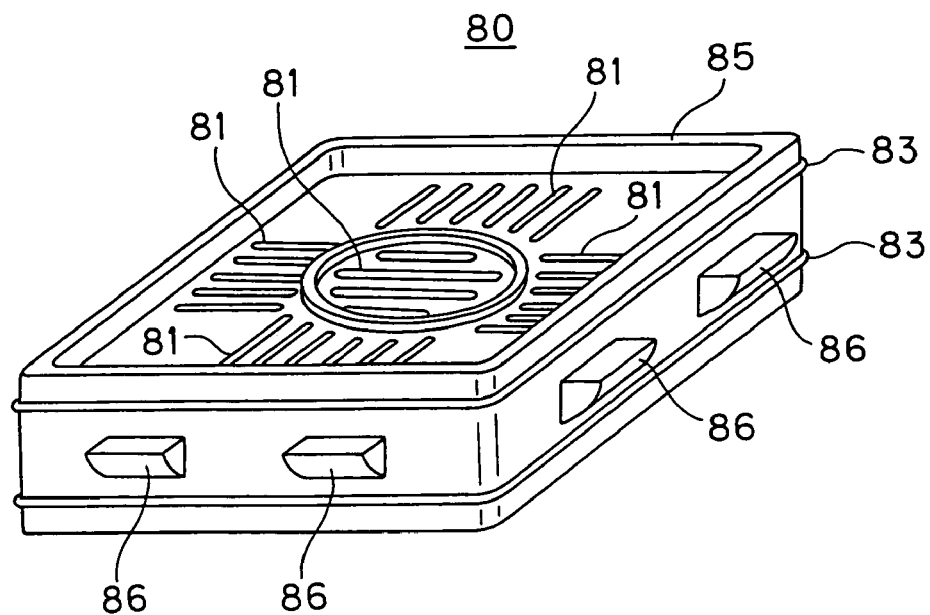
FIG. 6 is a perspective view of a resin plate disposed on an upper side.

On the other hand, the resin plate 80 disposed on the upper side is fixed in its position to the upper end of the cartridge body 41. FIG. 6 is a perspective view of this resin plate 80, in which a flanged portion 85 is formed to the entire outer periphery of the resin plate 80 so as to vertically extend. The flanged portion 85 has an outer peripheral surface in which seal grooves 82 are formed to be vertically in parallel, and seal members 83 are mounted to these seal grooves 82.

Two engaging claws 86 are formed to each surface of the flanged portion 85 at substantially vertically central portions thereof. These engaging claws 86 serve to fix the resin plate 80 to the cartridge body 41. Each claw 86 projects outward from each surface of the flanged portion 85 and has an upper flat portion and lower circularly expanded portion. These engaging claws 86 are engaged, as shown in FIG. 5, with engaging holes 49 formed to the upper portion of the cartridge body 41 so as to fix the resin plate 80 to the inner portion of the cartridge body 41.

That is, two engaging holes 49 are formed to each wall surface of the cartridge body 41 at positions corresponding to the location of the engaging claws 86 formed to the resin plate 80. The resin plate 80 is pushed into the cartridge body 41 in a flat state from the upper side thereof. Further, since the lower portion of the engaging claw 86 has the protruded circular-arc shape, the resin plate 80 moves downward in a manner such that the engaging claws 86 slide on the inner surface of the cartridge body 41, and when the engaging claws 86 reach the engaging holes 49 formed to the cartridge body 41, the engaging claws 86 are inserted into the holes 89, respectively. When inserted, since the engaging claw 86 has the flat upper portion, it engaged with the hole 89 so as not to be come off, thus fixing the resin plate 80 to the cartridge body 41.

As mentioned above, the seal member 83 is disposed above and below the engaging claws 86, and accordingly, when the engaging claws 86 are engaged with the engaging holes 89 to thereby fix the resin plate 80 to the cartridge body 41, the seal members 83 seal the engaging holes 49 at the upper and lower portions thereof. That is, the cartridge body 41 can be sealed by the seal members 83 in its inside and outside at the upper and lower positions of the engaging holes 49.

Furthermore, in the ion exchange filter 10 of the present embodiment, a coil spring 90 is disposed between the two resin plates 70 and 80. These two resin plates 70 and 80 are formed, at central portions thereof, with annular grooves 74 and 84 opposing to each other into which the respective ends of the coil spring 90 is fitted. That is, the annular groove 74 is formed in the upper surface of the lower resin plate 70 and, on the other hand, the annular groove 84 is formed in the lower surface of the upper resin plate 80. The respective end portions of the coil spring 90 are fitted to these grooves 74 and 84, respectively, so as to urge the upper and lower resin plate 80 and 70 in opposing directions. In this operation, since the upper resin plate 80 is fixed to the cartridge body 41, the lower resin plate 70 is accordingly urged downward by the coil spring 90.

According to the arrangement mentioned above, even if the ion exchange resin filling the cartridge 40 is consumed as time elapses, and the occupying ratio of the ion exchange resin occupying the interior of the cartridge 40 is lowered, the ion exchange resin is compressed by the resin plate 70 and the density thereof can thus be maintained to be constant. By maintaining constant the density of the ion exchange resin, the cooling water passing through the cartridge 40 can be uniformly contacted to the ion exchange resin without positional difference. In addition, if the density is lowered, there is a fear that the ions collide with each other by vibration or impact. However, such a fear can be eliminated by maintaining constant the density of the ion exchange resin, filling the cartridge, which is compressed by the resin plate 70.

In the state that the two resin plates 70 and 80 are disposed inside the cartridge body 41, the seal members 73 and 83 seal a portion between the resin plates 70 and 80 and the cartridge body 41, so that the cooling water flowing in the cartridge 40 can be surely prevented from leaking through a gap between the resin plates 70 and 80 and the cartridge body 41. Especially, according to the cartridge 40 of this embodiment, since a plurality of seal members 73 and 83 are provided in the axial direction of the cartridge 40, even if one seal member (for example, seal member 73) is damaged, the leaking of the cooling water can be surely prevented by the other seal member 83.

Furthermore, in the described embodiment, although the two seal members 83 are provided for the upper resin plate 80 and one seal member 73 is provided for the lower resin plate 70, the present invention is not limited to such embodiment, and for example, two seal members may be provided for the upper and lower resin plates 70 and 80, respectively.

Figure 7:
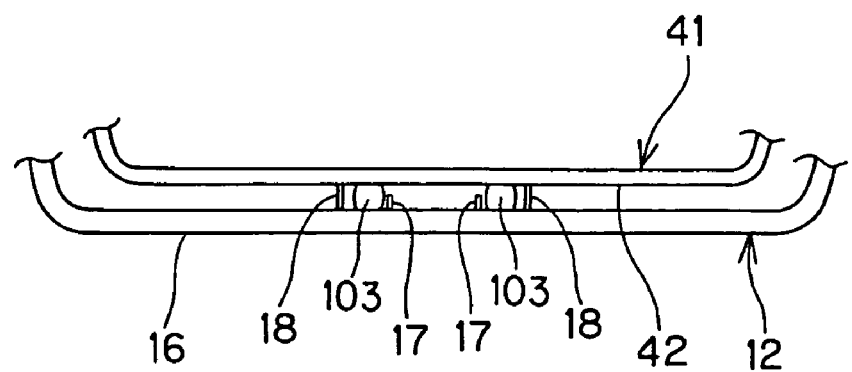
FIG. 7 is a side view showing a support structure for a housing of a bottom portion of the cartridge.
Figure 8:
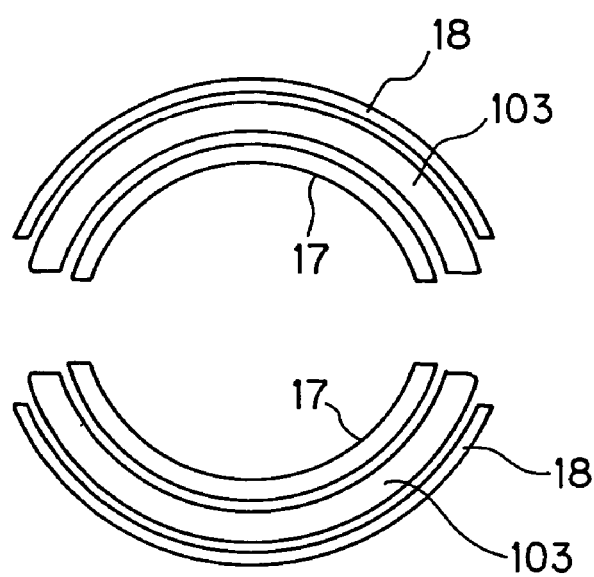
FIG. 8 is a plan view showing a support structure for a housing of a bottom portion of the cartridge.

The cartridge 40 of the structure mentioned above is mounted inside the housing 11 by being supported by first, second and third vibration isolation rubbers 101, 102 and 103 at the bottom surface 42, the peripheral wall portions and the upper end portion thereof. FIG. 5 shows such a state as that the upper end portion and the peripheral wall portions of the cartridge 40 are supported to the housing 11 by means of the first and second vibration isolation rubbers 101 and 102, and FIGS. 7 and 8 shows the state that the bottom surface 42 of the cartridge 40 is supported to the housing 11 by means of the third vibration isolation rubber 103.

The first vibration isolation rubber 101 is disposed to the upper end portion of the cartridge 40, and the first vibration isolation rubber 101 has a ring shape which is disposed between the upper end surface of the body 41 constituting the cartridge 40 and the lid 30 constituting the housing 11 so as to be snapped between the body 41 and the lid 30 at a position inside a fused portion between the casing 12 and the lid 30.

Furthermore, this first vibration isolation rubber 101 serves as a packing. The cooling water passing through the upper side resin plate 80 then flows outward of the cartridge 40. However, since the first vibration isolation rubber 101 acts as the packing, the leaking of the cooling water to the fused portion between the casing 12 and the lid 30 can be prevented.

Moreover, the cartridge 40 is supported to the inner peripheral wall surface of the housing 11 by means of the second vibration isolation rubber 102. A groove 45 to which the second vibration isolation rubber 102 is formed to the entire periphery of the outer peripheral surface of the body 41 constituting the cartridge 40, and the second vibration isolation rubber 102 is fitted to this groove 45. This second vibration isolation rubber 102 is snapped between the inner peripheral surface of the casing 12 constituting the housing 11 and the body 41 constituting the cartridge 40.

The second vibration isolation rubber 102 is disposed at a position slightly above the flow-in port formed to the casing 12 of the housing 11, and this second vibration isolation rubber 102 also serves as packing so as to prevent the cooling water flowed in the cartridge 40 through the flow-in port 13 from leaking to the fused portion between the lid 30 and the casing 11.

As mentioned above, the leaking of the cooling water to the fused portion between the casing 12 and the lid 30 can be effectively prevented by locating the first and second vibration isolation rubbers 101 and 102 of the ion exchange filter 10.

Further, it may be assumed that a small gap is partially formed between the second vibration isolation rubber 102 and the housing 11 because of any vibration or oscillation. In such case, the cooling water flowing inside the cartridge through the flow-in port 13 and passing through the gap 20 invades to an upper side of the second vibration isolation rubber 102. The invading cooling water passes through the engaging holes 49 and further invades inside the cartridge body 41. This invading cooling water is water before the filtration, and hence, it should be prevented from being mixed with the filtrated cooling water.

In this point of view, in the ion exchange filter 10 according to this embodiment, the seal members 83 mounted to the resin plate 80 are disposed above and below the engaging holes 49. Therefore, even if the cooling water invades inside the cartridge body 41 through the engaging holes 49, the seal members 83 can prevent the cooling water from further invading and from being mixed with the filtrated cooling water.

Furthermore, even if the cooling water before the filtration invades from the portion of the second vibration isolation rubber 102 and reaches the upper portion of the cartridge 40, the first vibration isolation rubber 101 snapped between the lid 30 and the cartridge body 41 prevents the cooling water from invading inside thereof. Because of this reason, even at the upper portion of the cartridge 40, the cooling water which is not filtrated can be effectively prevented from being mixed with the filtrated cooling water.

On the other hand, the bottom surface 42 of the cartridge 40 is supported by the third vibration isolation rubber 103 disposed to the bottom portion 16 of the housing 11. As shown in FIGS. 7 and 8, two pairs of ribs 17 and 18 are formed so as to describe coaxial circles at the central portion of the bottom of the casing 12. The respective ribs 17 and 18 have circular-arc shapes and are arranged in an opposing manner with lateral axis being the center thereof. The third vibration isolation rubbers 103 are disposed between the opposing ribs 17 and 18, respectively, in circular-arc shape.

The third vibration isolation rubbers 103 are snapped between the bottom portion 16 of the casing 12 and the bottom surface 42 of the cartridge body 41 so as to support the cartridge 40.

As mentioned above, in the ion exchange filter 10 of the present invention, since the first, second and third vibration isolation rubbers 101, 102 and 103 are provided, even if any vibration or impact be applied to the ion exchange filter 10, undesirable friction between the housing 11 and the cartridge 40, the positional shifting of the cartridge 40 with respect to the hosing 11 and the damage of the ion exchange filter 10 itself can be effectively prevented from causing, thus being advantageous.

Figure 9:
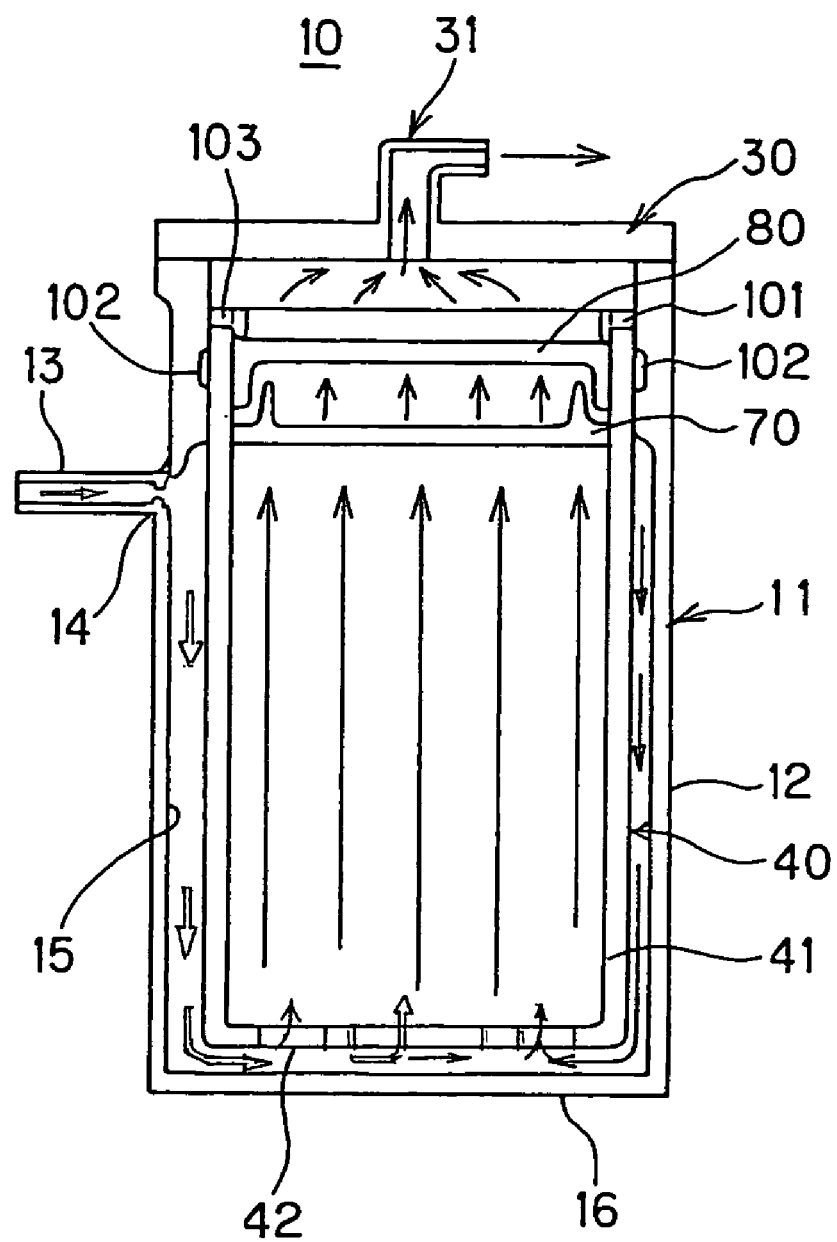
FIG. 9 is a view showing a flow of cooling water in the ion exchange filter.

In the ion exchange filter 10 of the structure mentioned above, the cooling water flows therein as shown in FIG. 9. The cooling water flowing into the cartridge 40 through the flow-in port 13 is reduced in its pressure during the passing through the orifice 14, and accordingly, even if the highly pressurized cooling water flows in the circuit of the cooling system 2, the cooling water having pressure lower than a withstand pressure of the ion exchange filter 10 formed of the resin material can flow into the ion exchange filter 10.

The cooling water passing through the orifice 14 flows downward in the flow passage 15 formed to the casing 12 toward the bottom portion 16 of the housing 11. In addition, since the gap 20 is formed between the inner peripheral surface of the casing 12 constituting the housing 11 and the outer peripheral surface of the body 41 constituting the cartridge 40, the cooling water passing through the orifice 14 flows this gap thoroughly. However, because the second vibration isolation rubber 102 is disposed at the slightly upper portion of the flow-in port 13, the cooling water is sealed by this second vibration isolation rubber 102 to thereby prevent the cooling water from leaking upward to the fused portion between the lid 30 and the casing 12 above the second vibration isolation rubber 102.

In the described ion exchange filter 10, of course, the flow-in port 13 is provided on the peripheral wall surface of the casing 12, so that the cooling water flowing inside cartridge 40 does not flow toward the lid (30) side and likely flows downward toward the bottom portion. That is, the described ion exchange filter 10 has the structure capable of effectively preventing the cooling water from flowing to the fused portion between the casing 12 and the lid 30. Because of this structure, the fused portion can maintain the highly fused performance without being influenced by the cooling water. The highly fused performance will result in high durability. Moreover, the coaxial arrangement of the cartridge 40 with respect to the housing 11 can be ensured for a long term.

The second vibration isolation rubber 102 having the cooling water sealing function is disposed to the upper portion of the casing 12. Therefore, an air layer defined in a section, between the second vibration isolation rubber 102 and the lid 30, which is not filled with cooling water, only occupies a small area in the upper portion of the ion exchange filter 10. On the other hand, the cooling water flows subsequently in a portion between the casing 12 and the cartridge body 41 at the lower side of the second vibration isolation rubber 102, and the cooling water fills the portion between the casing 12 and the cartridge body 41 at the most area in the vertical direction of the casing 12. Because of this reason, pressure difference is prevented from causing between the inside and outside of the cartridge 40, and the cartridge body 41 can be also effectively prevented from being expanded. In addition, this cooling water also serves as a heat insulating material to effectively prevent external heat from transferring inside the cartridge 40.

In a case of locating the flow-in port 13 to the lower portion of the casing 12, even if the second vibration isolation rubber 102 is disposed to the upper portion of the casing 12, there is a fear that the cooling water does not fill a portion above the flow-in port of the gap 20. In such case, almost all the portion of the gap 20 formed between the housing 11 and the cartridge 40 is filled up with air, and in such case, the pressure difference is caused between the inside and outside the cartridge 40, which will results in deformation of the cartridge 40 and any heat insulating effect will not be attained. The ion exchange filter 10 of the embodiment of the present invention can surely prevent such defects from causing.

Further, in a case where the cartridge 40 is formed of a material having a high strength such as metal material, even if almost all the portion of the gap 20 formed between the housing 11 and the cartridge 40 is filled up with air, and the pressure difference is caused between the inside and outside the cartridge 40, the cartridge 40 itself can withstand the pressure difference. In such case, it is not limited for the flow-in port 13 to be arranged to the upper portion of the casing 12, and the flow-in port 13 may be arranged any other portion as far as it is provided on the peripheral wall surface of the casing 12 at a position above the bottom surface 42 of the cartridge 40. That is, in the ion exchange filter 10 of this embodiment, the flow-in port 13 may be provided freely to a vertical position on the peripheral surface of the casing 12 above the bottom surface 42 of the cartridge 40 in accordance with the strength of a material to be used.

Furthermore, as shown in FIGS. 7 and 8, the third vibration isolation rubbers 103 supporting the bottom surface 42 of the cartridge body 41 and the circular-arc shaped ribs 17 and 18 snapping the third vibration isolation rubber 103 therebetween are disposed separately from each other at the central portion in the to-and-fro direction of the ion exchange filter 10. This central portion separating the third vibration isolation rubber 103 and the ribs 17 and 18 constitutes a water passage for the cooling water. Accordingly, as shown in FIG. 9, the cooling water flowing downward I in the flow passage 15 smoothly flow from one side end of the flow passage 15 to the other one side end thereof at the bottom portion of the casing 12 as shown with arrows.

According to the arrangement mentioned above, the cooling water spreads uniformly in the entire bottom portion of the casing 12 and is uniformly introduced into the cartridge 40 through the hole 46 and the slits 47 formed to the bottom surface of the cartridge body 41. The ions of the cooling water introduced inside the cartridge body 41 is removed by the ion exchange resin filling the inside of the cartridge body 41. Since the cooling water is substantially uniformly introduced into the cartridge 40 from the bottom surface 42 of the cartridge body 41, the ion exchange resin filing the inside of the cartridge 40 can fully filtrate the cooling water without partially filtrating the cooling water.

Figure 12:
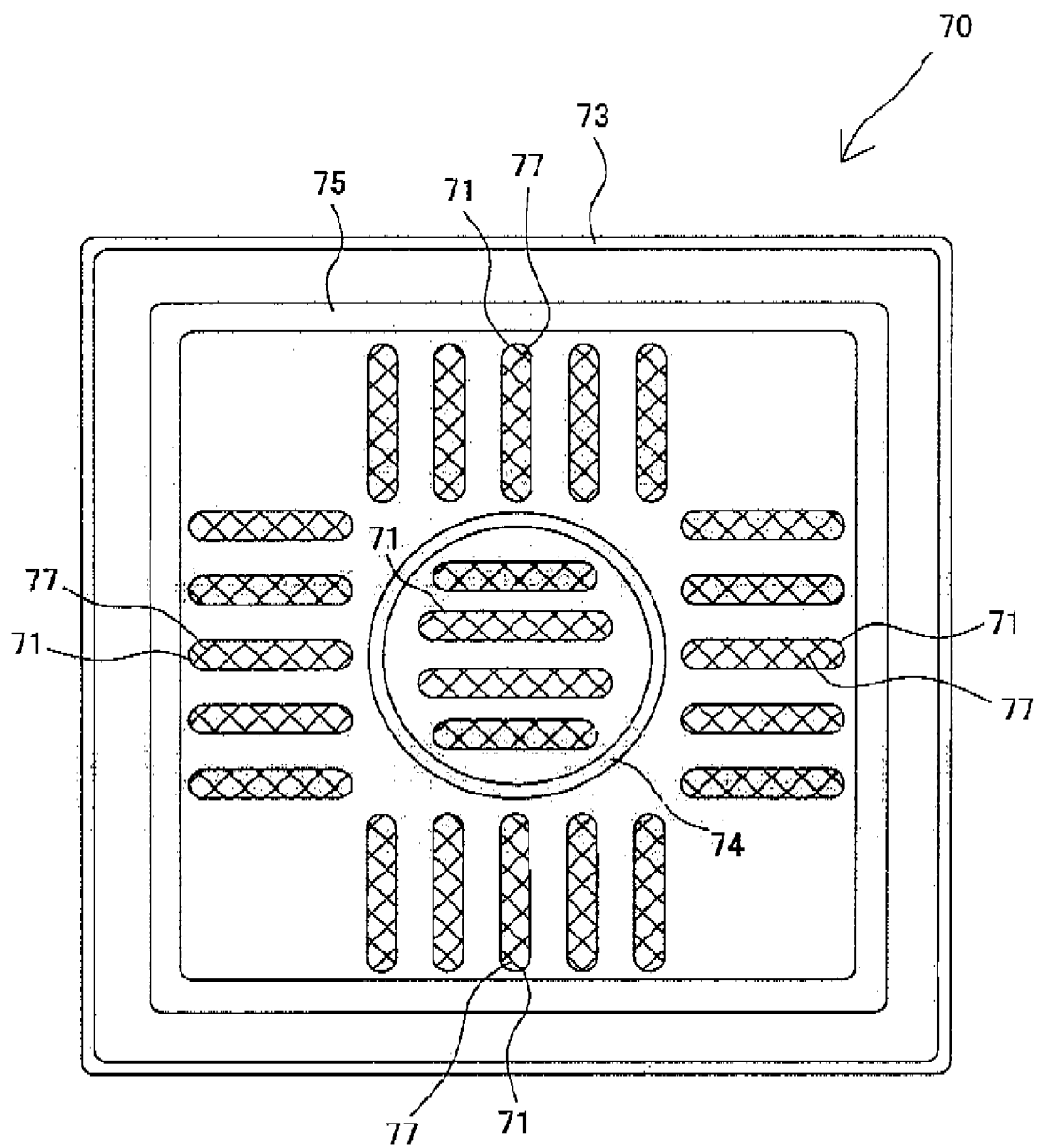
FIG. 12 is a plan view of a first plate in the ion exchange filter.
Figure 13:
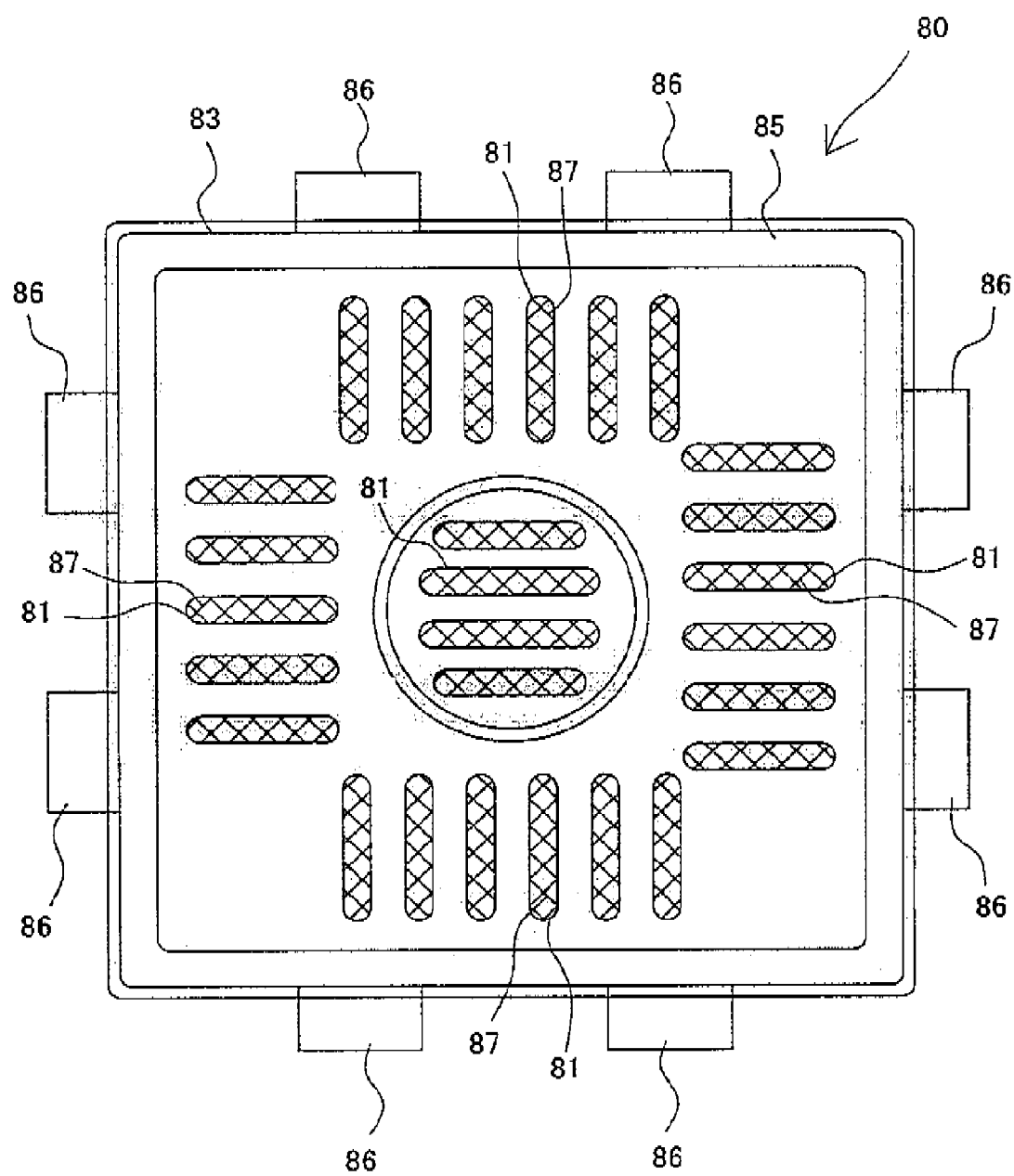
FIG. 13 is a plan view of a second plate in the ion exchange filter.

Thereafter, the cooling water passes through the ion exchange resin, reaches the upper portion of the cartridge 40 and then passes through a portion between two resin plates 70 and 80. At this time, since seal members 73 and 83 are provided to the outer peripheral surfaces of the resin plates 70 and 80, the cooling water passes through the slits 71 and 81 covered by the first and second meshes 87 and 77, as shown in FIGS. 12 and 13.

Thereafter, the cooling water flows through the flow-out port 31 formed to the lid 30 of the housing 11 and returns to the circuit of the cooling system 2. Further, during the flowing of the cooling water, the cooling water is sealed by the first vibration isolation rubber 101 and never leak out to the fused portion between the lid 30 and the casing 12 positioned outside the first vibration isolation rubber 101.

In the manner mentioned above, the cooling water is subjected to the ion exchanging operation and is filtrated.

Further, when the ion exchange filter 10 of the present embodiment is actually mounted, a mount jig 110 shown in FIG. 10 will be used. This mount jig 110 has a structure capable of clamping the ion exchange filter 10 by a mount fitting 111 mounted to the bottom portion of the ion exchange filter 10 and a mount fitting 113 disposed to the top portion thereof.

The lower side mount fitting 111 has a rectangular shape capable of fitting the bottom portion of the ion exchange filter 10 inside this mount fitting 111. The lower side mount fitting 111 is provided with lugs 112 at both sides thereof, and end portions of fastening screw members 115 are hooked to these lugs 112, respectively. On the other hand, the mount fitting 113 is a plate member curved so as to avoid the location of the flow-out port 31. The upper mount fitting 113 has both ends protruded outward so as to correspond to the lugs 112, respectively. The protruded end portions are formed with holes.

Each of the fastening screw members 115 has one end 116 curved in shape of hook, which is inserted into the hole of the lug 112 provided for the mount fitting 111, and the other one end 117 is formed with a screw portion. This end 117 is inserted into the hole formed to the upper mount fitting 113 so that the distal end portion extends upward through the fitting 113 and is fastened with a nut 120.

The mount jig 110 holds the ion exchange filter 10 by clamping the same from upper and lower sides by the mount fittings 111 and 113.

The second embodiment of the ion exchange filter will be described hereunder with reference to FIG. 11.

Figure 11:
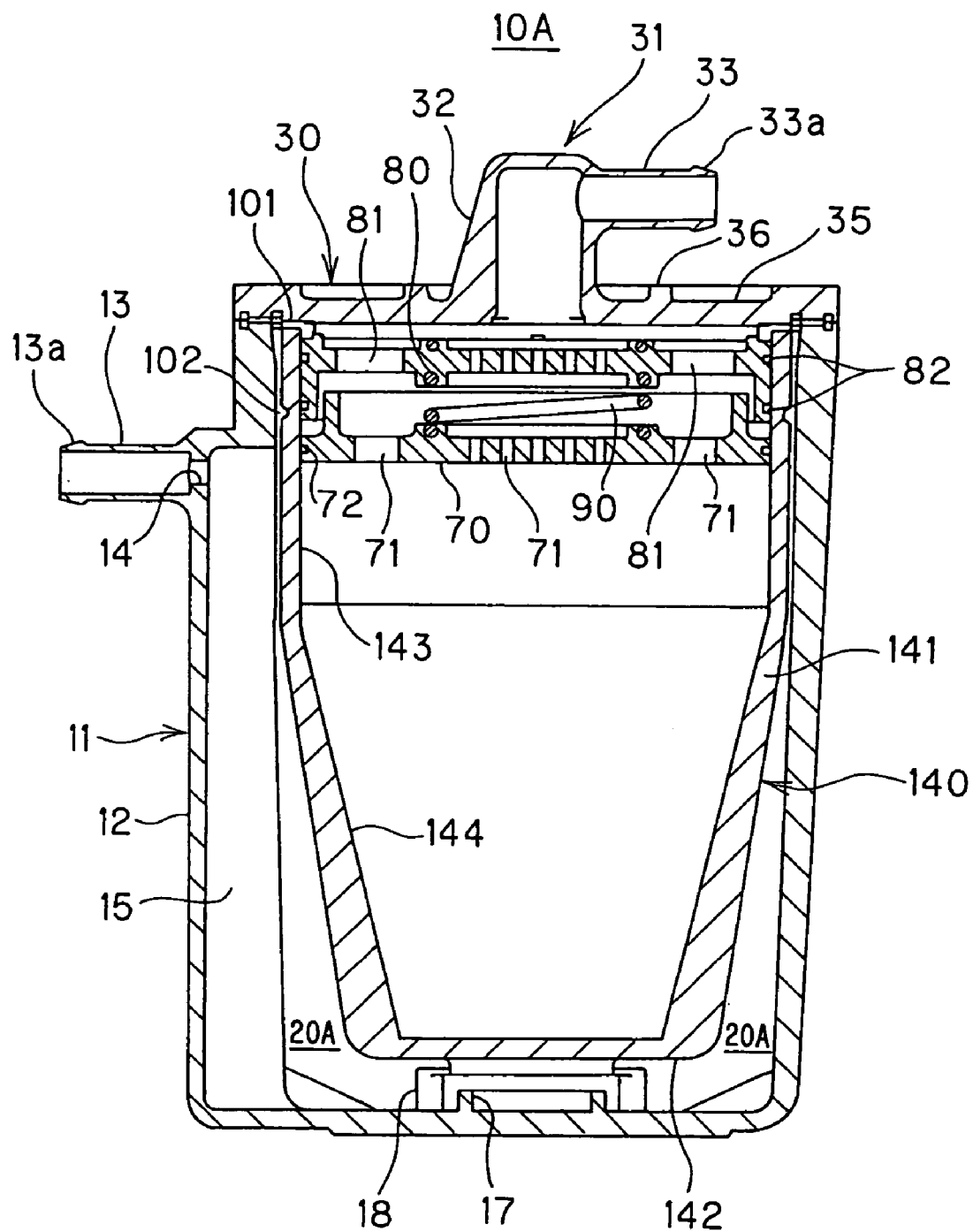
FIG. 11 is a vertical sectional view of an ion exchange filter according to another embodiment of the present invention.

The ion exchange filter 10A of this second embodiment shown in FIG. 11 is provided with a body 141 constituting a cartridge 140 having a lower portion tapered downward, which is different, in this structure, from the ion exchange filter 10 of the first embodiment. The other structure is substantially the same as that of the first embodiment, and accordingly, the same reference numerals are added to the corresponding portions and duplicated description thereof is omitted herein.

The ion exchange filter 10A of this second embodiment has a housing 11 having a rectangular shape constituting an outer structure of the filter and the cartridge 140 disposed inside the housing 11 and filled up with the ion exchange resin.

The housing 11 is composed of the casing 12 having an upper opened end and the lid 30 for closing this opened end. The casing 12 is constructed by four peripheral wall portions, and the flow-in port 13 projecting outward is formed to an upper portion of one of the peripheral wall portions 12A. This peripheral wall portion 12A is provided with the flow-passage 15 communicating the flow-in port 13 and a bottom portion of the casing 12 so as to expand, at its central portion, outward. The flow-in port 13 is communicated with the flow passage 15 through the orifice 14 at the upper portion of the flow passage 15, that is, the root portion of the flow-in port 13.

With the housing 11 of this second embodiment, circular-arc ribs 17 and 18 positioning and supporting the cartridge 140 are formed to the central portion of the bottom portion of the housing 11. A portion 19 of the casing on the upper side of the flow-in port 13 is formed so as to have a slightly large thickness.

The lid 30 is formed from a flat plate and the flow-out port 31 is disposed at the central portion thereof. A reinforcing rib 30 is formed to an outer surface 35 of the lid 30. The flow-out port 31 is composed of a base tube portion 32 extending upward from the lid 30 and a discharge tube portion 33 extending in a direction reverse to the extending direction of the flow-in port 13 at the right angle with respect to the base tube portion 32.

The cartridge 140 is provided with a body 141 having an upper opened end and two resin plates 70 and 80 closing the opened upper end of the cartridge body 141. The cartridge 140 has a bottom surface 142 which is also formed as a cooling water introduction port, and the opened upper end is formed as an outlet for the introduced cooling water.

The cartridge body 141 has an upper portion 143 of which peripheral wall portions extend, in the vertical direction, perpendicularly and has a lower portion 144 of which peripheral wall portions is tapered downward. According to this structure, a gap 20A defined between the cartridge 140 and the housing 11 is expanded downward of the ion exchange filter 10A.

According to the ion exchange filter 10A of the structure mentioned above, the cooling water flowing inside through the flow-in port 13 is reduced in its pressure by passing through the orifice 14, and furthermore, reduced at a time of passing the downwardly widened gap 20A between the cartridge 140 and the housing 11. Therefore, the ion exchange filter 10A formed or the resin material can be effectively prevented from overloading from the cooling water.

Further, in the foregoing description, although there are described the housings and the cartridges formed of resin materials in the first and second embodiments, the cartridge and the housing may be formed of metal material. However, it is preferred that these members are formed of the resin materials in terms of light weight and manufacturing cost.

Thus, as mentioned above, according to the ion exchange filters of the present invention, the formation of the orifice to the flow-in port makes it possible to reduce the pressure of a fluid such as cooling water flowing into the housing 11, thus preventing the housing from being damaged by the pressure.

Furthermore, since the fused portion between the casing and the lid is sealed by the seal member, the fluid passing through the housing does not leak thereto.

Still furthermore, since the cartridge is supported by the vibration isolation members to the inner surface of the housing, the positional shifting and damage thereof due to the vibration or impact of the cartridge can be effectively prevented.

In addition, since the fluid inlet and outlet of the cartridge are covered by the stainless meshes, the meshes can be themselves protected from being damaged. Therefore, the discharging of the ion exchange resin from the cartridge can be effectively prevented. Furthermore, since the mesh covering the inlet of the cartridge can be integrally formed with the cartridge when manufactured, the shifting of the mesh itself can be effectively prevented.

Still furthermore, since the mesh covering the outlet of the cartridge is disposed doubly (i.e., in series) in the fluid flowing direction, the discharging of the ion exchange resin from the outlet side of the cartridge can be also effectively prevented.

The mesh is molded integrally with a frame fitted inside the cartridge, and the seal member is fitted between the outer peripheral surface of the frame and the inner surface of the cartridge. Moreover, one or more than one seal members are provided to the respective frames so as to form a plurality of sealing portions in the axial direction of the cartridge, so that the inside and outside of the cartridge can be surely sealed from each other.

Especially, the seal members are disposed to upper and lower portions of the engaging claws formed to the outer peripheral surface of the plate disposed on the opened end side, so that the engaging holes engaged with the engaging claws are surrounded from upper and lower sides thereof to thereby seal the holes. Therefore, the invasion of the fluid, which is not filtrated, inside the cartridge through the engaging holes can be effectively prevented.

It is further to be noted that the present invention is not limited to the described embodiments and many other changes and modifications may be made without departing from the scopes of the appended claims.

The invention claimed is:

1. An ion exchange filter for a fuel cell system in which a fluid circulates, comprising:

a housing provided with a fluid flow-in port through which the fluid flows into the housing, and a fluid flow-out port through which the fluid flows out of the housing; and a cartridge which is disposed inside the housing in which an ion exchange resin is filled, the fluid flowing in the cartridge through the flow-in port is filtrated by the ion exchange resin and the filtrated fluid flows out through the flow-out port, wherein the housing is provided with a casing having an opened upper end and a lid closing the upper end opening, the lid having a peripheral edge joined and formed integrally with an upper end edge of the casing, wherein the fluid flow-in port is provided at an outer peripheral wall of the casing at a portion above a bottom surface of the cartridge disposed inside the housing, and the fluid flow-out port is formed to the lid, and wherein a gap is formed between the housing and the cartridge so that the fluid introduced inside the gap through the fluid flow-in port flows toward the bottom portion of the housing, and the fluid then flows, in a flow passage formed in the housing, upward from the bottom portion of the housing, wherein the cartridge has a fluid outlet covered with stainless first and second meshes disposed in series in a direction along which the fluid flows, wherein the cartridge includes a cartridge body having a cylindrical structure having an opened end defining the fluid outlet, and first and second plates fitted inside the cartridge body at the opened end, wherein the first and second meshes are integrally formed with the first and second plates, respectively, and wherein the first and second plates have outer peripheral surfaces, the cartridge body includes an inner surface, and the cartridge includes seal members fitted between the outer peripheral surfaces of the first and second plates and the inner surface of the cartridge body so that one or more seal members are provided for each plate so as to provide a plurality of sealing portions in the axial direction of the cartridge.

2. The ion exchange filter according to claim 1, wherein the flow-in port is provided with an orifice configured to reduce a pressure of the fluid flowing through the flow-in port.

3. The ion exchange filter according to claim 1, further comprising a seal member disposed in a gap defined between the housing and the cartridge so as to seal a portion between an inner peripheral surface of the casing and an outer peripheral surface of the cartridge and is disposed entirely circumferentially of the casing and the housing so as to section the gap into a fluid flow-in side and a joining side joining the casing and the lid, and another seal member disposed between the lid and the cartridge so as to prevent the fluid flowing from the cartridge to the flow-out port from leaking to the joining side.

4. The ion exchange filter according to claim 1, wherein a vibration isolation member is disposed between the cartridge and the housing so as to support the cartridge with respect to an inner surface of the housing.

5. The ion exchange filter according to claim 1, wherein the cartridge has a fluid inlet covered with a stainless mesh.

6. The ion exchange filter according to claim 5, wherein the stainless mesh covering the fluid inlet is integrally formed with the cartridge during molding of the cartridge.

7. The ion exchange filter according to claim 1, wherein the first plate is disposed on the opened end of the cartridge body, the second plate is disposed inside the first plate in the cartridge body, and the first plate is provided with two seal members.

8. The ion exchange filter according to claim 7, wherein the first plate disposed on the opened end side of the cartridge body is formed, at an outer peripheral surface, with an engaging claw so as to be engaged with the cartridge body, the two seal members are disposed to the outer peripheral surface of the first plate above and below the engaging claw in the vertical direction of the cartridge body, the cartridge body is formed with an engaging hole at a portion near the opened end thereof so as to be engaged with the engaging claw, and the seal members are snapped between the outer peripheral surface of the first plate and the inner surface of the cartridge body so as to surround the engaging hole engaged with the engaging claw from the upper and lower sides thereof to thereby seal the engaging hole.

9. The ion exchange filter according to claim 1, wherein the housing and the cartridge are formed of a resin.

10. The ion exchange filter according to claim 1, wherein the cartridge disposed inside the housing has a portion tapered downward toward the bottom portion of the housing so that the gap formed therebetween is widened toward the bottom portion of the housing.

* * * * *